US012477277B2

(12) United States Patent
Grosche et al.

(10) Patent No.: US 12,477,277 B2
(45) Date of Patent: Nov. 18, 2025

(54) AUDIO DEVICE AND METHOD FOR PRODUCING A SOUND FIELD

(71) Applicant: HUAWEI TECHNOLOGIES CO., LTD., Shenzhen (CN)

(72) Inventors: Peter Grosche, Munich (DE); Martin Pollow, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 18/511,673

(22) Filed: Nov. 16, 2023

(65) Prior Publication Data

US 2024/0098418 A1 Mar. 21, 2024

Related U.S. Application Data

(63) Continuation of application No. PCT/EP2022/050878, filed on Jan. 17, 2022.

(30) Foreign Application Priority Data

May 27, 2021 (WO) ................. PCT/EP2021/064141

(51) Int. Cl.
*H04R 5/02* (2006.01)
*H04R 1/26* (2006.01)
(Continued)

(52) U.S. Cl.
CPC ................. *H04R 5/02* (2013.01); *H04R 1/26* (2013.01); *H04R 1/403* (2013.01); *H04R 3/12* (2013.01);
(Continued)

(58) Field of Classification Search
CPC ...... H04R 1/403; H04R 5/02; H04R 2201/40; H04R 2201/401; H04R 2201/405; H04R 2203/12; H04R 2205/024
See application file for complete search history.

(56) References Cited

U.S. PATENT DOCUMENTS

| | | | |
|---|---|---|---|
| 5,809,150 | A | 9/1998 | Eberbach |
| 8,345,883 | B2 | 1/2013 | Takumai et al. |

(Continued)

FOREIGN PATENT DOCUMENTS

| | | | |
|---|---|---|---|
| EP | 2056621 | A2 | 5/2009 |
| EP | 1796429 | B1 | 1/2017 |

(Continued)

OTHER PUBLICATIONS

Takeoka, "Directivity Controllable Parametric Loudspeaker using Array Control System with High Speed 1-bit Signal Processing," AES Japan Section Conference in Sendai, Sendai Mediatheque, Japan, Total 6 pages (Oct. 10-11, 2012).

(Continued)

*Primary Examiner* — Ryan Robinson
(74) *Attorney, Agent, or Firm* — Leydig, Voit & Mayer, Ltd.

(57) ABSTRACT

A device and a method are provided for producing a sound field are disclosed. The device comprises a plurality of loudspeakers arranged at a plurality of locations within a plane and a processing circuitry configured to drive the plurality of loudspeakers. A first subset of the plurality of loudspeakers defines a first rhombus within the plane and a second subset of the plurality of loudspeakers defines a second rhombus within the plane. The first rhombus is oriented substantially perpendicular to the second rhombus. Further subsets of the plurality of loudspeakers may define further rhombic sub-arrays. The audio device may be implemented as a soundbar or a sound panel, which provides a richer sound experience.

22 Claims, 15 Drawing Sheets

(51) Int. Cl.
*H04R 1/40* (2006.01)
*H04R 3/12* (2006.01)

(52) U.S. Cl.
CPC .... *H04R 2201/401* (2013.01); *H04R 2203/12* (2013.01)

(56) References Cited

U.S. PATENT DOCUMENTS

| | | | | |
|---|---|---|---|---|
| 9,319,794 | B2 | 4/2016 | Betlehem et al. | |
| 9,936,324 | B2 * | 4/2018 | Ochiai | H04R 1/403 |
| 10,667,036 | B2 | 5/2020 | Kim | |
| 11,089,401 | B2 * | 8/2021 | Cambrell | H04R 3/00 |
| 11,223,902 | B2 * | 1/2022 | Zhao | H04R 1/403 |
| 2006/0204022 | A1 | 9/2006 | Hooley et al. | |
| 2007/0019831 | A1 | 1/2007 | Usui | |
| 2008/0226093 | A1 | 9/2008 | Kushida et al. | |
| 2013/0223658 | A1 * | 8/2013 | Betlehem | H04R 5/02 381/307 |
| 2024/0221716 | A1 * | 7/2024 | Thompson | H04R 1/406 |

FOREIGN PATENT DOCUMENTS

| | | | | |
|---|---|---|---|---|
| JP | 06105387 | A | * | 4/1994 |
| WO | 2004107811 | A1 | | 12/2004 |
| WO | 2009097462 | A2 | | 8/2009 |

OTHER PUBLICATIONS

Eldek, "Enhancement of Phased Array Size and Radiation Properties Using Staggered Array Configurations," Progress In Electromagnetics Research C, vol. 39, pp. 49-60 (2013).

Glegg et al., "Aeroacoustics of Low Mach Number Flows," Fundamentals, Analysis and Measurement, Total 6 pages (2017).

Van Der Wal et al., "Design of Logarithmically Spaced Constant-Directivity Transducer Arrays," J. Audio Eng. Soc., vol. 44, No. 6, pp. 497-507, Manuscript received Jan. 26, 1996; revised Apr. 6, 1996 (Jun. 1996).

* cited by examiner

Horizontal beams (60° right)

AUDIO DEVICE AND METHOD FOR PRODUCING A SOUND FIELD

CROSS-REFERENCE TO RELATED APPLICATIONS

This application is a continuation of International Application No. PCT/EP2022/050878, filed on Jan. 17, 2022, which claims priority to International Patent Application No. PCT/EP2021/064141, filed on May 27, 2021. The disclosures of the aforementioned applications are hereby incorporated by reference in their entireties.

TECHNICAL FIELD

Embodiments of the present disclosure relate to audio processing and sound generation. For example, the present disclosure relates to an audio device comprising a plurality of loudspeakers for producing a sound field as well as a corresponding method.

BACKGROUND

Loudspeakers may be regarded as a fertile ground for design. Industrial design may define forms and user related features, while acoustic design may define electroacoustic architecture for the user to enjoy a target sound experience. An interesting design for loudspeakers are flat panel loudspeakers because they can be flexibly mounted on the wall (like a picture). Besides appealing and original aesthetics, it may allow easy mounting and acoustic features like controlling the sound emitted into the room in 3D, an omnidirectional radiation, an immersivity feeling and ultimately, a richer 3D audio experience. Designing such flat panel loudspeakers can be challenging due to several aspects, for example, the acoustics might be difficult due to limited depth, the choice of components might be limited or the internal volume available might be restricted.

Beamforming in the context of loudspeaker arrays refers to the directional emission of sound into the environment. A 2D flat panel loudspeaker array mounted on a wall has the advantage that it can be configured to steer beams in any direction into the room. This can be exploited to provide a 3D sound experience (e.g. a sound field) to a listener by sending sound beams towards reflecting surfaces in such a way that the sound is reflected and arrives at the listener from the desired direction. For example, a sound beam steered towards the ceiling of the room may be reflected and arrive at the listener from above. If certain criteria in terms of delay and attenuation are met, the listener may localize the sound coming from the reflection point at the ceiling and not as coming from the actual device. This effect can then be exploited for obtaining a full 3D sound experience where sound source may be localized from any position around the listener.

In a home-theater scenario, a 3D audio experience can be provided by audio devices referred to as soundbar systems, usually composed of one or more horizontal lines of speakers, possibly integrated with speakers oriented in different directions such as up-firing or side-firing speakers. Similar to a soundbar, a sound panel can be configured to steer beams corresponding to different input channels. In soundbars the speakers are typically arranged horizontally which allows steering beams in the horizontal plane. This is suitable for rendering standard horizontal sound fields like stereo and surround sound format such as 5.1, 7.1, and the like by exploiting reflections at the side walls of the listeners environment.

A 2D loudspeaker array in a sound panel can steer sound beams into the vertical direction as well. This has applications together with 3D surround sound formats such as Dolby Atmos or general 7.1.2 signals which contain height information. This height channels can be reproduced using a beam steered towards and reflecting from the ceiling to create a perception of sound originating from above the listener. It is known (e.g. U.S. Pat. No. 5,809,150) how reflections can be used for simulating virtual sources. According to the Haas principle, one condition that has to be met in order to let the user perceive the reflected signal (which is arriving later due to the longer paths it needs to travel) and not the direct signal coming from the source (e.g. the soundbar) is that the reflected sound reaching the user should be at least 10 dB louder than the direct sound.

SUMMARY

Devices and methods according to this disclosure enable a plurality of loudspeakers for producing a rich sound experience while requiring only a small number of loudspeakers.

This is achieved by the subject matter of the independent claims. Further implementation forms are apparent from the dependent claims, the description and the figures.

According to a first aspect, a device for producing a sound field is provided. The device according to the first aspect comprises a plurality of loudspeakers (for example also referred to as transducers) arranged at a plurality of locations within a plane. The plane may be a common plane for emitting sound waves in a direction substantially normal to the plane. The device may comprise a housing, wherein the plurality of loudspeakers are arranged, for example, at one side of the housing, wherein the plurality of loudspeakers may be configured to emit sound waves in a direction substantially normal to this side of the housing. Throughout the disclosure device may also be referred to as audio device, comprising a soundbar, a sound panel or any other audio device.

The device according to the first aspect further comprises a processing circuitry, which for example may comprise one or more processors, configured to process one or more input signals to obtain a plurality of output signals and output the plurality of output signals to the plurality of loudspeakers. For example, outputting the plurality of output signals to the plurality of loudspeakers for driving the loudspeakers, for example, a respective membrane of each of the plurality of loudspeakers.

A first subset, of the plurality of loudspeakers, comprises at least three loudspeakers, wherein the centers of the at least three loudspeakers of the first subset are arranged at at least three corners of a first rhombus within the plane. The first rhombus has a first primary (or main) diagonal and a first secondary diagonal, wherein the first primary diagonal is longer than the first secondary diagonal. The first subset of the plurality of loudspeakers may, for example, comprise four loudspeakers. As used in this disclosure, subset can also be understood as subgroup; rhombus can also be understood as notional rhombus.

A second subset of the plurality of loudspeakers comprises at least three loudspeakers, wherein the centers of the at least three loudspeakers of the second subset are arranged at at least three corners of a second rhombus within the plane. The second rhombus has a second primary (or main)

diagonal and a second secondary diagonal, wherein the second primary diagonal is longer than the second secondary diagonal. The second subset of the plurality of loudspeakers may, for example, comprise four loudspeakers.

The first (notional) rhombus and the second (notional) rhombus are arranged in such a way relatively to another that the first primary diagonal of the first rhombus extends substantially perpendicularly to the second primary diagonal of the second rhombus. For instance, in the installed audio device the first primary diagonal may be extending substantially horizontally, while the second primary diagonal may be extending substantially vertically. In such an arrangement the loudspeakers of the first subset would primarily (but not exclusively) serve for generating a sound impression in height, while the loudspeakers of the second subset primarily serve for generating a sound impression in the horizontal plane.

The length of the first secondary diagonal is between a minimum spacing, d, of the loudspeakers and 2d, which is two times the minimum spacing. The same can also apply to the second secondary diagonal, which can have a length between d and 2d. Thus, an improved audio device is provided comprising a plurality of loudspeakers for producing a rich sound experience in horizontal and vertical direction requiring only a small number of loudspeakers.

In a further possible implementation form of the first aspect, the first primary diagonal has substantially the same length as the second primary diagonal and/or the first secondary diagonal has substantially the same length as the second secondary diagonal. Thus, a similar or the same arrangement of the loudspeakers may be used for the first and the second subgroup resulting, for instance, in a less complex input signal processing.

In a further possible implementation form of the first aspect, the first secondary diagonal has substantially the same length as a side of the first rhombus and/or wherein the second secondary diagonal has substantially the same length as a side of the second rhombus. Thus, a similar or the same arrangement of the loudspeakers may be used for the first and the second subgroup resulting, for instance, in a less complex input signal processing.

In a further possible implementation form of the first aspect, a third subset of the plurality of loudspeakers comprises at least three loudspeakers, wherein the centers of the at least three loudspeakers of the third subset are arranged at at least three corners of a third rhombus within the plane. The third rhombus has a third primary diagonal and a third secondary diagonal, wherein the third primary diagonal is longer than the third secondary diagonal. The third primary diagonal of the third rhombus extends substantially parallel to the first primary diagonal of the first rhombus and thereby substantially perpendicular to the second primary diagonal of the second rhombus. Thus, an improved audio device is provided comprising a plurality of loudspeakers for producing a richer sound experience requiring only a small number of loudspeakers. The third subset of the plurality of loudspeakers may, for example, comprise four loudspeakers.

In a further possible implementation form of the first aspect, the third primary diagonal of the third rhombus extends along the same notional line, for example a notional horizontal line, as the first primary diagonal of the first rhombus. For the installed device the same notional line may be a horizontal line. Thus, a similar or the same relative arrangement of the loudspeakers may be used for the first and third subset resulting, for instance, in a less complex input signal processing.

In a further possible implementation form of the first aspect, at least some of the loudspeakers of the second subset are arranged above or below the notional line defined by the first primary diagonal of the first rhombus and the third primary diagonal of the third rhombus. For the installed audio device at least some of the loudspeakers of the second subset are arranged above or below the substantially horizontal line defined by the first primary diagonal of the first rhombus and the third primary diagonal of the third rhombus.

In a further possible implementation form of the first aspect, the third primary diagonal has substantially the same length as the first primary diagonal and/or the third secondary diagonal has substantially the same length as the first secondary diagonal. Thus, a similar or the same arrangement of loudspeakers may be used for the first, the second and the third subset resulting, for instance, in a less complex input signal processing.

In a further possible implementation form of the first aspect, the third secondary diagonal has substantially the same length as a side of the third rhombus. Thus, a similar or the same arrangement of the loudspeakers may be used for the first, the second and the third subset resulting, for instance, in a less complex input signal processing.

In a further possible implementation form of the first aspect, one of the plurality of loudspeakers may be part of the second subset and the first subset or the third subset. In other words, one of the plurality of loudspeakers may be located at and define a corner of the second rhombus and a corner of the first rhombus or a corner of the third rhombus. Thus, the number of loudspeakers may be further reduced, while still providing a rich sound experience.

In a further possible implementation form of the first aspect, one of the plurality of loudspeakers is part of the second subset and the first subset or the third subset. In other words, one of the plurality of loudspeakers is located at a corner of the second rhombus and a corner of the first rhombus or a corner of the third rhombus. Thus, advantageously, the number of loudspeakers may be further reduced, while still providing a rich sound experience.

In a further possible implementation form of the first aspect, a fourth subset of the plurality of loudspeakers comprises at least three loudspeakers, wherein the centers of the at least three loudspeakers of the fourth subset are arranged at at least three corners of a fourth rhombus within the plane, wherein a side of the fourth rhombus is between about 2 and 4 times longer than a side of the first rhombus. The fourth rhombus has a fourth primary diagonal and a fourth secondary diagonal, wherein the fourth primary diagonal is longer than the fourth secondary diagonal. For example, a side of the fourth rhombus is about 3 times longer than a side of the first rhombus. Thus, an improved audio device is provided comprising a plurality of loudspeakers for producing a more richer sound experience, wherein the loudspeakers of the fourth subset primarily provide a lower frequency sound than the loudspeakers of the first subset. The fourth subset of the plurality of loudspeakers may, for example, comprise four loudspeakers.

In a further possible implementation form of the first aspect, the fourth primary diagonal of the fourth rhombus extends substantially perpendicular to the first primary diagonal of the first rhombus or substantially perpendicular to the second primary diagonal of the second rhombus. Thus, the loudspeakers of the fourth subset may have a well-defined orientation relative to the loudspeakers of the first subset resulting, for instance, in a less complex input signal processing.

In a further possible implementation form of the first aspect, the processing circuitry is configured to implement one or more beamformers for processing, based on a desired main radiation direction, the plurality of input signals to obtain the plurality of output signals. Thus, an improved audio device is provided comprising a plurality of loudspeakers for producing a richer sound experience requiring only a small number of loudspeakers.

In a further possible implementation form of the first aspect, the processing circuitry is configured to implement one or more first beamformers for processing, based on a first desired main radiation direction, the plurality of input signals in a first frequency range to obtain the plurality of output signals for the fourth subset of the plurality of loudspeakers and to implement one or more second beamformers for processing, based on a second desired main radiation direction, the plurality of input signals in a second frequency range to obtain the plurality of output signals for the first and/or second subset of the plurality of loudspeakers. The first frequency range may be a high frequency range and the second frequency range may be a low frequency range. The two ranges may be partially overlapping or non-overlapping.

In a further possible implementation form of the first aspect, for the non-overlapping case for example, a crossover frequency between the first frequency range and the second frequency range may be between about 2 and about 4 kHz, for example about 3 kHz. Thus, an improved audio device is provided comprising a plurality of loudspeakers for producing a richer sound experience at low and high frequencies requiring only a small number of loudspeakers.

In a possible implementation form, the loudspeakers within the subset are adjacent loudspeakers. For example, the loudspeakers of the first subset are arranged next to each other. The distance between such loudspeakers may be a minimum spacing d.

As described above, the device according to the first aspect also comprises implementations with a plurality of first subsets and/or second subsets. Such plurality of subsets may be arranged horizontally and vertically in an alternating manner. Accordingly, such devices provide all advantages and technical effects described above and in more detail with respect to the embodiments.

According to a second aspect a method for producing a sound field is provided. The method comprises:

operating a plurality of loudspeakers arranged at a plurality of locations within a plane, and processing a plurality of input signals to obtain a plurality of output signals and outputting the plurality of output signals to the plurality of loudspeakers, wherein a first subset of the plurality of loudspeakers comprises at least three loudspeakers, wherein the centers of the at least three loudspeakers are arranged at at least three corners of a first rhombus within the plane, wherein the first rhombus has a first primary diagonal and a first secondary diagonal, wherein the first primary diagonal is longer than the first secondary diagonal, wherein a second subset of the plurality of loudspeakers comprises at least three loudspeakers, wherein the centers of the at least three loudspeakers are arranged at at least three corners of a second notional rhombus within the plane, wherein the second rhombus has a second primary diagonal and a second secondary diagonal, wherein the second primary diagonal is longer than the second secondary diagonal; and wherein the first primary diagonal of the first rhombus extends substantially perpendicularly to the second primary diagonal of the second rhombus.

The length of the first secondary diagonal is between a minimum spacing, d, of the loudspeakers and 2d, which is two times the minimum spacing. The same can also apply to the second secondary diagonal, which can have a length between d and 2d. The length of the secondary diagonals effects sound quality. At a length equal to minimum spacing d the quality of the produced sound is improved as a high cut-off frequency can be achieved.

Based on the plurality of output signals of the first and second subset of loudspeakers a desired main radiation direction can be obtained. Therefore, main radiation in the desired direction is obtained. In other words, a sound radiation mainly in the desired direction is obtained through the output signals of the loudspeakers of the first and second subset.

In an implementation a desired main radiation direction comprises a horizontal main radiation direction and/or a vertical main radiation direction. The sound field can thus be adapted. For example, dependent of the main radiation direction, horizontally and/or vertically, the impression of a sound source at a desired position in space can be created.

In an implementation the desired main radiation direction is obtained by configuring one or more processors of the processing circuitry to providing one or more beamforming filters to obtain a plurality of output signals. The filters may be determined according to the first and second subset of loudspeakers. Specifically, the filters may apply a gain and delay obtained based on the plurality of locations of the loudspeakers and the desired main radiation direction.

For instance, in the installed audio device the first primary diagonal may be extending substantially horizontally, while the second primary diagonal may be extending substantially vertically. In such an arrangement, for generating a horizontal main radiation, the filters would primarily (but not exclusively) use the loudspeakers of the first subset in low frequencies and the loudspeakers of the second subset for high frequencies. For generating a vertical main radiation, the filters would primarily (but not exclusively) use the loudspeakers of the second subset in low frequencies and the loudspeakers of the first subset for high frequencies.

Thus, the desired main radiation direction in horizontal and vertical direction is obtained over a large frequency range requiring only a small number of loudspeakers.

The method according to the second aspect of the present disclosure can be performed by the device according to the first aspect of the present disclosure. Thus, further features of the method according to the second aspect result directly from the functionality of the audio device according to the first aspect as well as its different implementation forms described above and below. Further features and implementation forms of the method according to the second aspect correspond to the features and implementation forms of the apparatus according to the first aspect.

According to a third aspect, a computer program product is provided comprising a computer-readable storage medium for storing program code which causes a computer or a processor to perform the method according to the second aspect when the program code is executed by the computer or the processor.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless specifically noted otherwise.

Before describing different embodiments of an audio device in more detail, in the following some technical background as well as conventional audio devices will be introduced.

Figure 1:
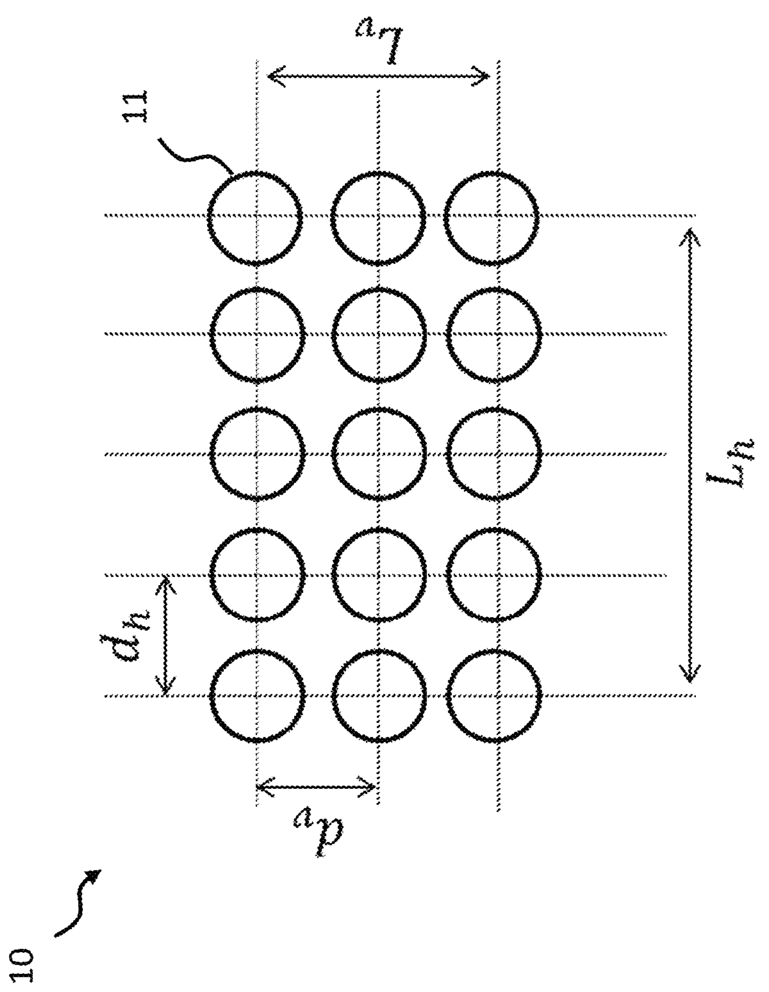
FIG. 1 shows a schematic diagram illustrating a plurality of loudspeakers arranged as a 2D rectangular planar array.

FIG. 1 shows a conventional 2D planar array loudspeaker arrangement 10 of an audio device, where the plurality of loudspeakers 11 are arranged on a regular square grid. If the length of each side of the square is L and the array is composed of $N=n \cdot n$ loudspeakers 11, then the spacing (distance) between respective loudspeakers 11 is $d=L/(n-1)$ in the two orthogonal directions in the plane. In a typical scenario as a wall mounted audio device these two directions correspond to horizontal and vertical directions. Further, the length L and the number of loudspeakers n may vary between the directions depending on the specific use case for the audio device and importance of the respective direction (human performance on sound source localization is much higher in the horizontal direction than in the vertical).

For a loudspeaker array 10 of the type illustrated in FIG. 1, spatial aliasing occurs when half the wavelength is smaller than the distance between two neighboring loudspeakers 11. To reduce aliasing at high frequencies the spacing between the loudspeakers 11 should be small (e.g., with $\lambda=c_s/f$ and the speed of sound in air $c_s=343$ m/s the wavelength at f=8 kHz is $\lambda=4.3$ cm which means that aliasing-free beamforming at this frequency can only be achieved if the array element spacing $d=\lambda/2=2.15$ cm). For the specific loudspeaker arrangement 10 shown in FIG. 1 the total number of loudspeakers 11 is N=15 with $n_h=5$ horizontal elements with a spacing $d_h$ and $n_v=3$ vertical elements with a spacing $d_v$. The overall size (e.g. the aperture) is $L_h=d_h*n_h$, $L_v=d_v*n_v$.

For obtaining good resolution at low frequencies the length L of the array 10 should be as large as possible. According to the Rayleigh limit of resolution the angular width of the beam is defined by the wavelength divided by the aperture size (overall extension of the array 10 in the respective dimension). An array of length L can therefore create beams of width w (in radians) up to a wavelength $\lambda=w*L$. As will be appreciated, the lower the frequencies the wider the beam gets for the same array geometry. At the same frequency, a larger array can create narrower beams. The relation between array dimension (aperture L) and beam width and frequency is linear.

Generally, the array aperture should be larger than one wavelength. For a desired lower operating frequency of the array of f=500 Hz (λ=0.686 m) the array should have dimensions of about 70 cm. While the high frequency limit is rather sharp, the degradation of beamforming performance towards low frequencies is rather smooth and is mostly determined by the efficiency of the audio device. Controlling low frequencies with a wavelength larger than the size of the array requires a lot of power and speakers which are capable of producing high sound pressure levels.

For achieving suitable sound pressure levels at such low frequencies, the effective radiating area of the implemented loudspeakers should be sufficiently large. For reproducing frequencies below 1 kHz a loudspeaker should be at least 3 cm in diameter (5 cm or larger will have an even better acoustic performance).

For a loudspeaker array with a given number of loudspeakers N at equal spacing the two aspects described above limit the operational frequency range of the device to within specific bounds. For example, the 2D array 10 of FIG. 1 designed with frequency bounds 500 Hz and 8 kHz and equal spacing between the elements with $d_v$, $d_h$=2.15 cm, $L_h$, $L_v$=68.6 cm would require $$N = \frac{68.6}{2.15} = 31.67$$

elements per dimension. Thus, the 2D array would require more than 900 loudspeakers, which is obviously not practical. Furthermore, loudspeakers having a diameter smaller than 2 cm will not be capable of reproducing the low frequencies (e.g., 500 Hz) well.

Therefore, the beamforming performance which can be achieved by an audio device with a loudspeaker array is strongly frequency dependent. The lower frequency limit is defined by the aperture size. However, there is no explicit boundary as the beams just get wider towards lower frequencies. If the frequency is increased, the beam continuously becomes narrower since the ratio of aperture size and wavelength increases. Since a narrower beam is advantageous for many applications, the array performance improves as the frequency increases. In designing a beamformer it is usually possible to create wider beams if desired.

For higher frequencies, additional beams will occur (in addition to the main beam) at angles different from the intended main direction. These extra beams are known as sidelobes when they are weaker than the main beam, and aliases when they are at the same level as the main beam. Aliases occur at frequencies above the aliasing frequency. For many applications, sidelobes are acceptable provided they are substantially lower than the main beam.

One goal for beamforming in consumer audio devices, such as sound bars and flat panel loudspeakers, is to exploit reflections at the walls to achieve that a user in front of the device gets the impression of sound sources distributed all around him. To obtain this effect it is important that the reflected sound arriving at the listener reaches a certain intensity which is higher than the direct sound arriving at the listener directly from the device. Therefore, the width of the beams can be critical. The actual width that can be tolerated depends on the angular difference between the direction of the reflection and the direction of the direct sound.

According to the Haas principle, one condition that has to be met so that the user perceives the reflection and not the direct front coming from the source (e.g. the soundbar) is that the reflected sound reaching the user should be 10 dB louder than the direct sound. As the reflected sound is travelling a longer distance, the additional delay is requiring an extra intensity difference to compensate. In a typical scenario, a reflected-to-direct-sound ratio of 20 dB is desired for achieving a localization of the reflected sound direction.

Therefore, a typical beamformer configured to achieve this target is defined by two directions: a main direction steering a maximum of sound intensity such that it reflects at a suitable wall towards the listener and a zero direction which steers a notch of minimum intensity directly towards the listener. This effectively maximizes the reflected-to-direct sound ratio. The actual width of the beam is in that case less critical. Sidelobes may be tolerated as long as they are not affecting the zero direction.

Figure 2:
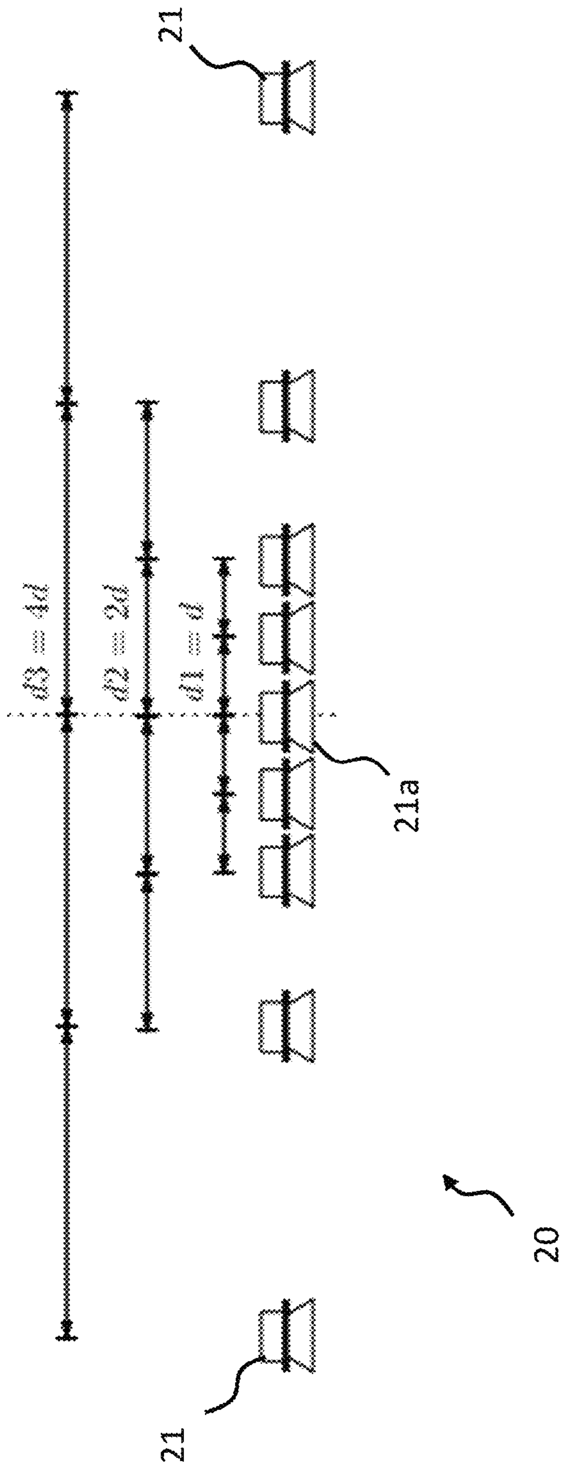
FIG. 2 shows a schematic diagram illustrating a plurality of loudspeakers arranged as a symmetric logarithmic array implementing three nested line arrays.

One known approach that can be used to improve array performance is to use an array with unequally spaced loudspeakers so that it includes both closely spaced loudspeakers to eliminate spatial aliasing at high frequencies and a large aperture to maximize source resolution at low frequencies. A common choice is to use logarithmically spaced loudspeakers that are clustered at one end of a line array. For 1D line speaker arrays this topic is studied (e.g. "*Design of Logarithmically Spaced Constant-Directivity Transducer Arrays*" MENNO VAN DER WAL, EVERT W. START, DIEMER DE VRIES, *J. AudioEngSoc.*, Vol. 44, No. 6, 1996). 2D examples mostly stem from microphone and other sensor arrays. To achieve an improved coverage of the required frequency range, a symmetrically and logarithmically spaced loudspeaker array 20 as shown in FIG. 2 can be used for implementing beams for various frequency bands. The symmetric logarithmic loudspeaker array 20 shown in FIG. 2 comprises three nested line arrays each with five loudspeakers 21 (overall nine loudspeakers 21). The central loudspeaker 21*a* is shared by all three arrays.

Starting from the central loudspeaker 21*a* and the first line array defined from its number of speakers N and the smallest distance $d_1$ between two successive loudspeakers 21, the symmetrically and logarithmically spaced topology is built adding loudspeakers to get M line arrays with the same number of loudspeakers N and a distance defined as 2≤n≤N, $d_n=k^{n-1}d_1$. Each of the line arrays may then be used to emit only a sub-band of the audio signal. The m-th line array may be limited to be used over a frequency range up to:

$$f_{m_{up}} = \frac{c}{d_m} = \frac{c}{k^{m-1}d_1}$$

and the relation between two successive boundary frequencies, for 2≤m≤M, is given by $$\frac{f_{m_{up}}}{f_{m-1_{up}}} = k.$$

Thus, the m-th line array may be used to emit the audio signal sub-band with a bandwidth defined by the two frequencies $f_{m_{up}}/k$ and $f_{m_{up}}$.

Figure 3:
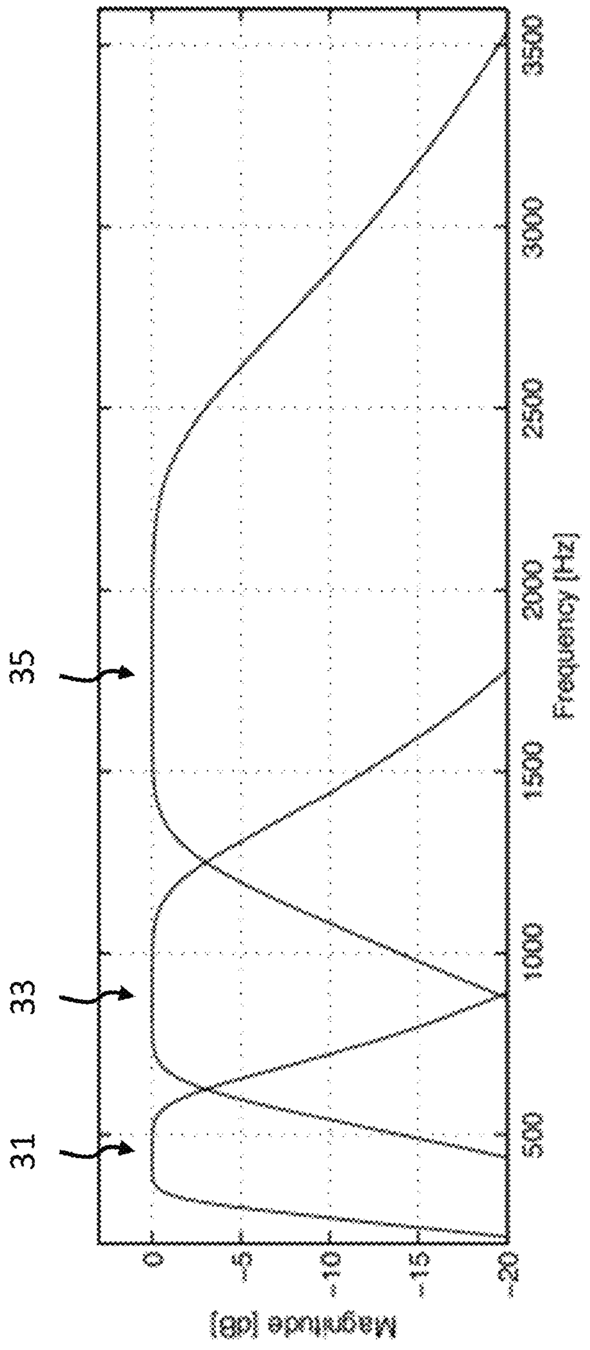
FIG. 3 illustrates a filter-bank for obtaining sub-band signals for the three line arrays shown in FIG. 2.
Figure 4:
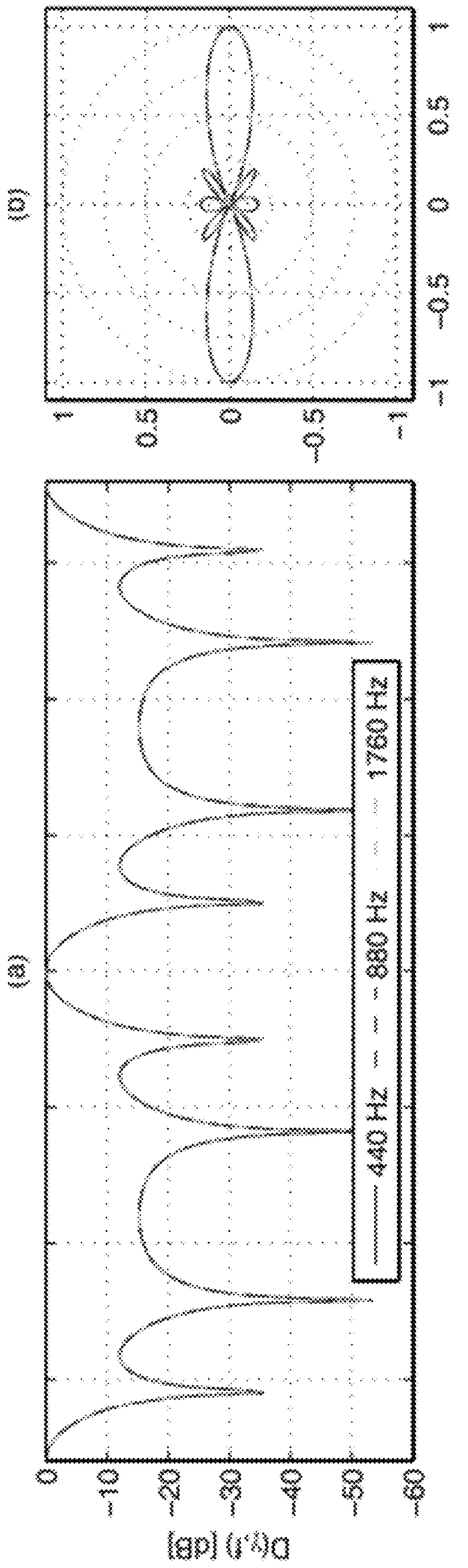
FIG. 4 shows a directional response for the beamformer of FIG. 2.

An example for the sub-band decomposition (e.g. filterbank using band-pass filters) is illustrated in FIG. 3 (which shows magnitude as a function of frequency] for the symmetric logarithmic array shown in FIG. 3 with a distance d=9 cm. As can be taken from FIG. 5, the three resulting line arrays are implemented using a first sub-band 31 from about 312.5 to about 625 Hz (m=3), a second sub-band 33 from about 625 to about 1250 Hz (m=2) and a third sub-band 35 from about 2500 to about 2500 Hz (m=1). The choice of k=2 is natural because it results in a constant directivity condition where the beams in all sub-bands have the same width.

In this example, the band-pass filters of FIG. 3 used to split the audio signal into sub-bands may be Butterworth filters of order 6. The resulting beams for each of the bands are theoretically exactly the same since the distance and density of the three line arrays are exactly the same relatively to the frequency band processed. This is also illustrated in the plots shown in FIG. 3, which show that the value for the various frequencies within the defined sub-bands (namely 440, 880 and 1760 Hz) are identical.

Thus, the logarithmic spacing is effective in increasing the low frequency coverage without requiring a large number of loudspeakers. However, the limitation of this approach is that the loudspeakers are shared between the different arrays and are typically of the same size. To be able to achieve high sound pressure levels for low frequencies, the speakers are large which limits the minimum spacing and therefore the effectivity of the array for high frequencies.

Figure 5:
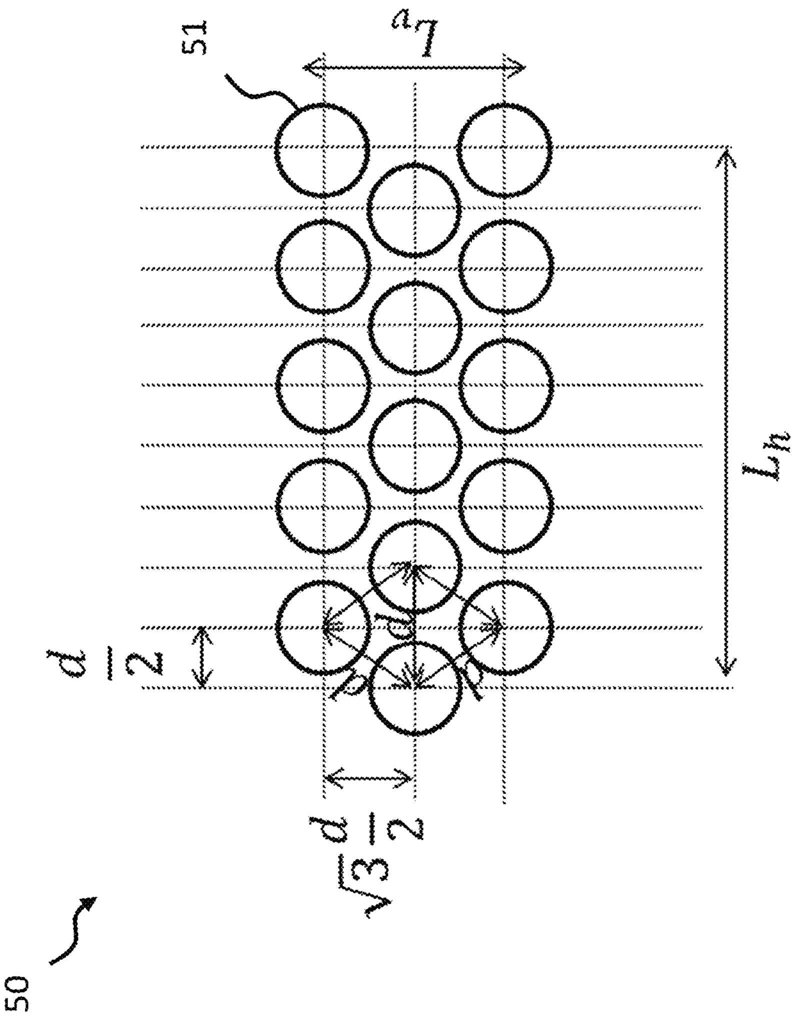
FIG. 5 shows a schematic diagram illustrating a plurality of loudspeakers arranged as a staggered 2D planar array.

One known approach for increasing the upper frequency limit of a loudspeaker array which allows to reduce the effective spacing between neighboring elements are staggered arrays. A staggered array loudspeaker arrangement 50 comprising a plurality of loudspeakers 51 is shown in FIG. 5. Keeping the distance d between neighboring loudspeakers 51 fixed but moving every second line by d/2 in horizontal direction reduces the effective spacing in horizontal dimension to d/2. Thus, the aliasing frequency is effectively doubled. More specifically, keeping the spacing fixed at d results in an horizontal spacing between the loudspeakers 51 of $$\sqrt{3}\frac{d}{2} \approx 0.87.$$

The horizontal aperture size $L_h$ is increased to $$n_h * d + \frac{d}{2},$$

while in the vertical direction it is reduced to $$n_h * \sqrt{3}\frac{d}{2}.$$

As will be appreciated, the staggered array arrangement 50 shown in FIG. 5 can improve the high frequency limit mostly in one direction, usually the horizontal direction. If the arrangement is rotated by 90 degrees, the effects on the horizontal and vertical directions are exchanged. However, the aperture size is not increased and therefore the lower frequency limit is not improved. The staggered array arrangement 50 shown in FIG. 5 is thus limited in the overall frequency range which is achievable.

As will be described in the following in the context of FIGS. 6 to 15, embodiments disclosed herein provide an audio device 100 (shown in FIGS. 10 and 13), such as a soundbar or sound panel 100, with a loudspeaker arrangement 102 for producing a sound field with a rich sound experience, but only requiring a small number of loudspeakers 101.

Figure 6:
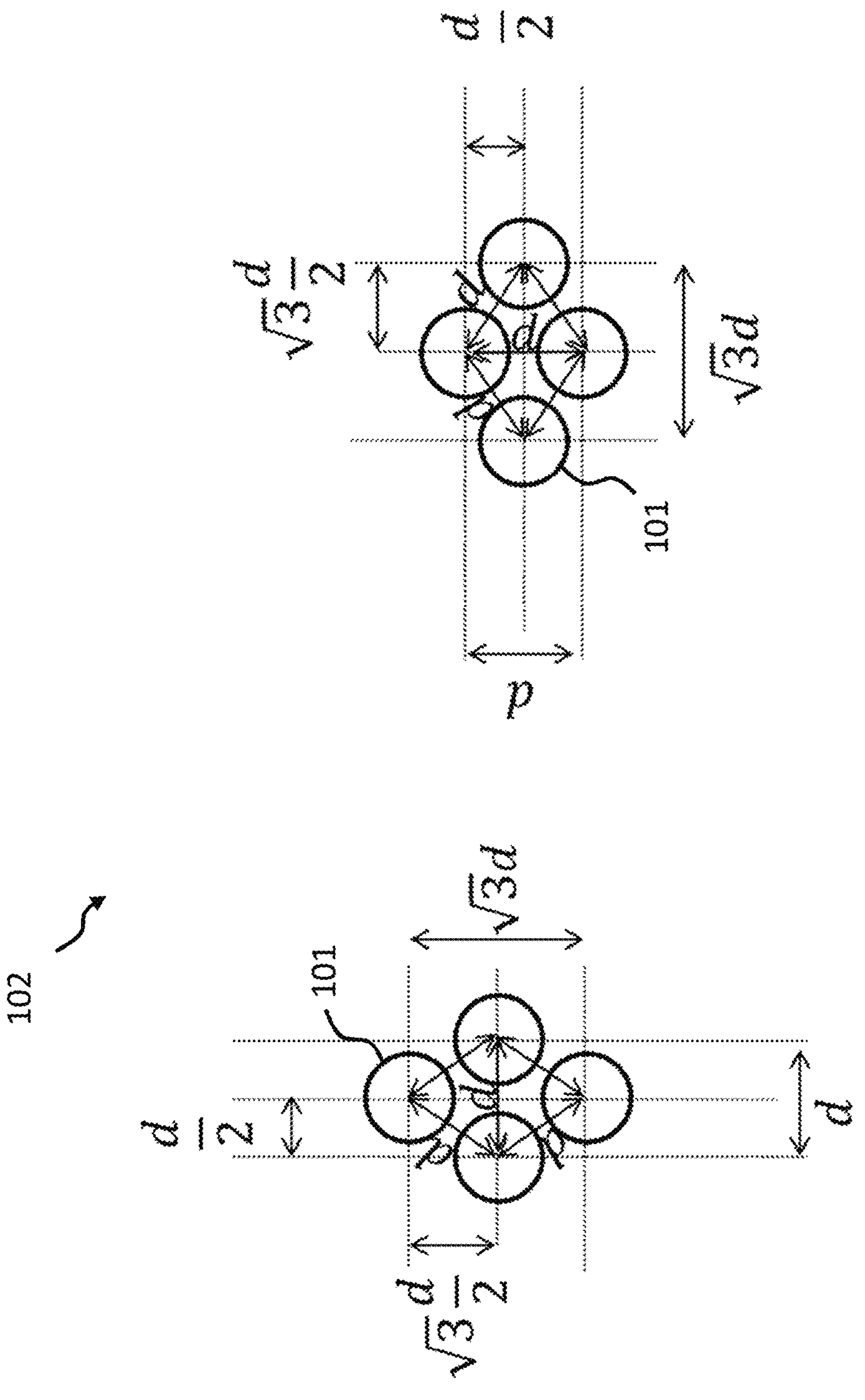
FIG. 6 shows a schematic diagram illustrating a loudspeaker arrangement of a device according to an embodiment, including a plurality of loudspeakers arranged as a first horizontal rhombus and a second vertical rhombus.

In an embodiment illustrated in FIG. 6, the audio device 100 (see FIG. 13) comprises a loudspeaker arrangement 102 with a plurality of loudspeakers 101 (also referred to as transducers 101) arranged at a plurality of locations within a common plane for emitting sound waves in a direction substantially normal to the plane. The audio device may comprise a housing 120 (such as in the embodiment illustrated in FIG. 13), wherein the plurality of loudspeakers 101 are arranged in one side wall of the housing 120 and configured to emit sound waves in a direction substantially normal to this side wall of the housing 120.

The audio device 100 further comprises a processing circuitry 110 (described in more detail further below in the context of FIGS. 11 and 12), which may comprise one or more processors, configured to process one or more input signals to obtain a plurality of output signals and output the plurality of output signals to the plurality of loudspeakers 101 for driving the plurality of loudspeakers 101, in particular a respective membrane of each of the plurality of loudspeakers 101.

As can be taken from FIG. 6, a first subset of the plurality of loudspeakers 101 comprises four loudspeakers, wherein the centers of the four loudspeakers of the first subset are arranged at the four corners of a first notional horizontally orientated rhombus within the plane (on the right hand side in FIG. 6). The first rhombus has a first horizontally orientated primary (or main) diagonal and a first secondary diagonal, wherein the first primary diagonal is longer than the first secondary diagonal.

A second subset of the plurality of loudspeakers 101 comprises four loudspeakers as well, wherein the centers of the four loudspeakers of the second subset are arranged at the four corners of a second notional vertically orientated rhombus within the plane (on the left hand side in FIG. 6). The second rhombus has a second vertically orientated primary (or main) diagonal and a second secondary diagonal, wherein the second primary diagonal is longer than the second secondary diagonal. It should be noted, that the same applies for a first and second subset comprising three loudspeakers, even if not shown explicitly.

The first notional rhombus and the second notional rhombus are arranged in such a way relatively to another that the first primary diagonal of the first rhombus extends substantially perpendicularly to the second primary diagonal of the second rhombus. As already described above, in the installed audio device 100 the first primary diagonal may be extending substantially horizontally, while the second primary diagonal may be extending substantially vertically. In such an arrangement the loudspeakers of the first subset would be primarily (but not exclusively) for generating a sound impression in height, while the loudspeakers of the second subset are primarily for generating a sound impression in the horizontal plane.

In an embodiment, the length of the first (or second) secondary diagonal is between, d and 2d, where d is the minimum spacing of the loudspeakers. For example, the length of the first secondary diagonal is d and the length of the second secondary diagonal is 1.5d.

In an embodiment, the first primary diagonal of the first rhombus may have the same length as the second primary diagonal of the second rhombus. In an embodiment, the first secondary diagonal of the first rhombus may have the same length as the second secondary diagonal of the second rhombus.

As will be described in more detail in the following, the first and second rhombus of the loudspeaker arrangement 102 of the audio device 100 shown in FIG. 6 define the basic building blocks for providing further embodiments of the audio device 100. In the embodiment illustrated in FIG. 6 the first rhombus and the second rhombus have the same size. Moreover, in the embodiment illustrated in FIG. 6, all four sides and the secondary diagonal of the respective rhombus have the same length d defining the spacing of the elements.

As can be appreciated from FIG. 6, even though the spacing between all loudspeakers 101 is d, the actual loudspeaker spacing relevant for defining the upper frequency limit in the horizontal and the vertical direction is $$\frac{d}{2}\sqrt{3}\frac{d}{2},$$

respectively. Thus, the upper cut-off frequency is advantageously increased by a factor of $$\frac{d}{\frac{d}{2}} = 2$$

for the horizontal direction and a factor of $$\frac{d}{\sqrt{3}\frac{d}{2}} \approx 1.15$$

for vertical. The aperture size stays d for the horizontal orientation and is increased to $\sqrt{3}$d for the vertical orientation. If rotated by 90° the effect on the upper cut-off frequency and aperture size for horizontal and vertical direction is reversed. As the minimum spacing d is typically defined by the dimensions of the loudspeakers 101 used for building the loudspeaker array, the rhombus shape is optimal for obtaining a small loudspeaker distance and thus a high cut-off frequency. It also allows to use larger loudspeakers to achieve the same frequency range. This can have advantages as larger loudspeakers can often produce a higher sound pressure level.

Figure 7:
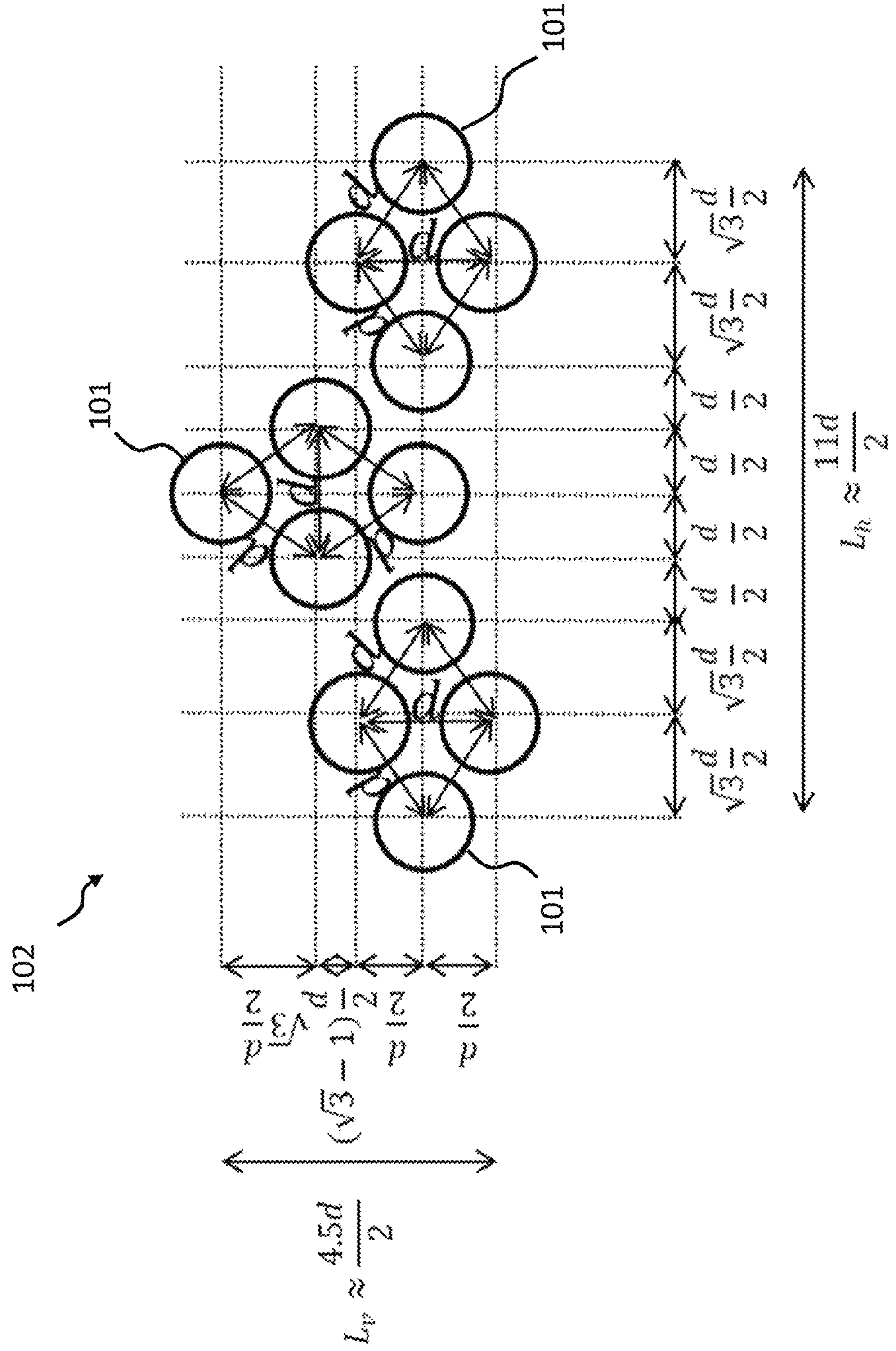
FIG. 7 shows a schematic diagram illustrating a loudspeaker arrangement of a device according to a further embodiment, including a plurality of loudspeakers arranged as a first and third horizontal rhombus and a second vertical rhombus.

A further embodiment of the loudspeaker arrangement 102 of the audio device 100 based on the rhombic shaped building blocks shown in FIG. 6 is illustrated in FIG. 7. In the embodiment shown in FIG. 7, a third subset of the plurality of loudspeakers 101 of the audio device 100 comprises four loudspeakers, wherein the centers of the four loudspeakers of the third subset are arranged at the four corners of a third rhombus within the plane (located on the left hand side of FIG. 7). The third notional rhombus has a third primary diagonal and a third secondary diagonal, wherein the third primary diagonal is longer than the third secondary diagonal. The third primary diagonal of the third rhombus extends substantially parallel to the first primary diagonal of the first rhombus and thereby substantially perpendicular to the second primary diagonal of the second rhombus.

Thus, the loudspeaker arrangement 102 of FIG. 7 is defined by three rhombus-shaped elements, namely one arranged vertically and two horizontally. As will be appreciated, this may be a minimum configuration which can achieve both horizontal and vertical beamforming. The horizontal aperture is $$\frac{11}{2} * d,$$

the vertical is far less. This is due to the fact that the number of loudspeakers 101 is limited in product applications and an emphasis of the horizontal orientation is beneficial for the human perception (e.g. left/right is more important than up/down). For better performance in one or the other dimension additional elements can be added in any of the four directions.

Extending the aperture size of the audio device 100 can easily be achieved by adding further elements which increase the length in the desired direction. However, for achieving the desired frequency range in further embodiments of the audio device 100 one or more second layers of rhombus shaped elements with a larger spacing may be added, such as one or more of the further elements illustrated in FIG. 8. This ensures not only that the aperture size is increased but also that loudspeakers with a larger membrane diameter and thus a larger maximum sound pressure at low frequencies can be used.

Figure 8:
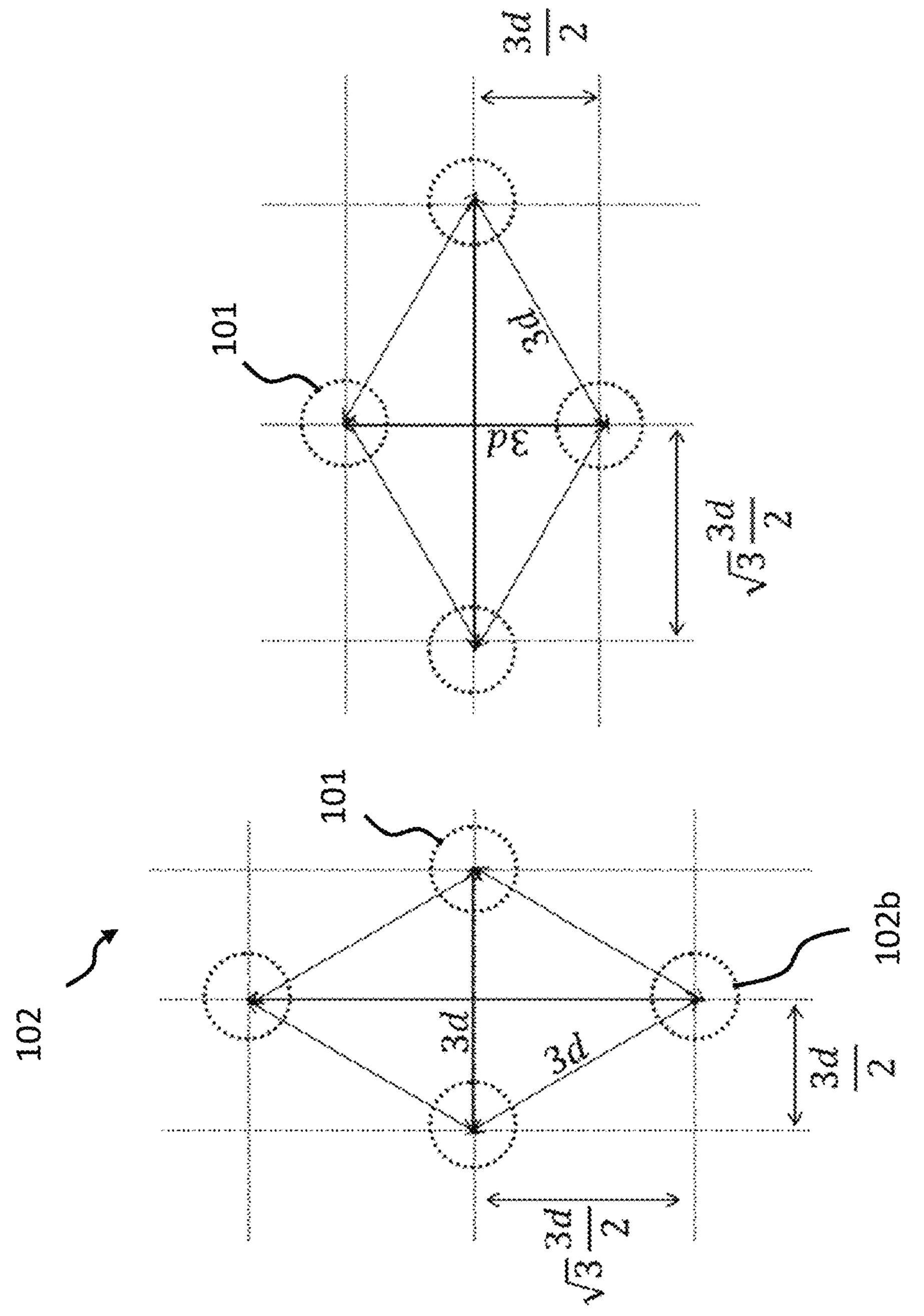
FIG. 8 shows a schematic diagram illustrating two further subsets of a plurality of loudspeakers implemented by a device according to an embodiment.

Thus, in an embodiment, the plurality of loudspeakers 101 of the audio device 100 may comprise a fourth subset with four loudspeakers, wherein the four loudspeakers of the fourth subset are arranged at four corners of a fourth notional rhombus within the plane, wherein a side of the fourth rhombus is between about 2 and 4, in particular 3 times longer than a side of the first rhombus (as illustrated in FIG. 8). The fourth rhombus has a fourth primary diagonal and a fourth secondary diagonal, wherein the fourth primary diagonal is longer than the fourth secondary diagonal.

The concept of rhombus shaped elements can be easily scaled to cover a different frequency range. Scaling the loudspeaker spacing d affects upper and lower cut-off frequency ranges in a linear fashion. Therefore, changing the spacing d is a very effective parameter for tuning the loudspeaker arrangement 102 of the audio device 100 to the desired frequency range. Because the maximum extend of the small rhombus shaped elements is $\sqrt{3}$d and the minimum spacing between neighboring transducers is $$\frac{d}{2},$$

the frequency range of each element is extended compared to equally spaced arrays.

Figure 9:
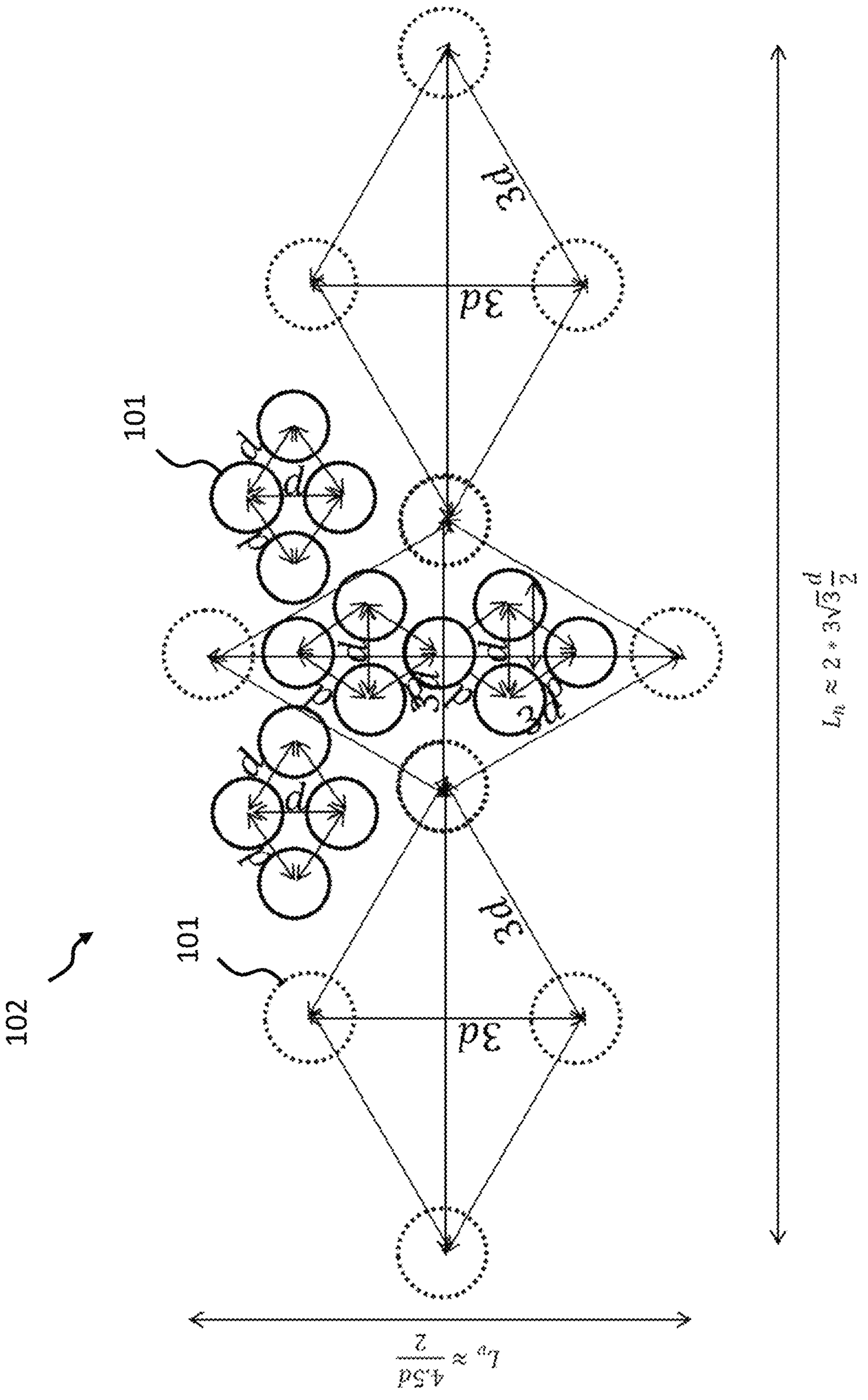
FIG. 9 shows a schematic diagram illustrating a loudspeaker arrangement of a device according to a further embodiment, including a plurality of loudspeakers arranged as a stacked rhombus array.

In further embodiments of the audio device 100 several subsets, e.g. sub-arrays of the plurality of loudspeakers 101 (e.g. small and large rhombuses) may be stacked together (similar to the logarithmic arrays described above) in the loudspeaker arrangement 102, as illustrated in FIG. 9. Due to the wider frequency range covered by each element, the ratio of the size of the different elements can be increased. While k=2 is optimal for the conventional logarithmic arrays described above, k=3 may be optimal for the rhombus array implemented by the audio device 100 according to an embodiment, because each covers a wider frequency range. This also ensures the required space to use larger loudspeakers 101 for the low frequency array. Which results in higher sound pressure levels.

For the embodiment shown in FIG. 9, stacking significantly extends the operating frequency range. Small loudspeakers with small spacing d (in the range 2-4 cm) allow for a high upper frequency limit from above 10 kHz. Adding the second layer of loudspeakers (e.g. the fourth subset) with a spacing of about 3d (6-12 cm) allows for obtaining a large aperture size and enables the use of large diameter loudspeakers which is beneficial for high sound pressure levels at low frequencies.

For typical use cases, the loudspeaker array of the audio device 110 is used to produce audio content provided in a typical multi-channel audio format. The individual channels of that content may be processed by a beamformer each corresponding to the desired direction. The idea is to exploit reflections at walls to achieve the localization in the correct direction. Note that more elements like amplifiers may be required between the beamformer and the actual loudspeakers. As illustrated in FIG. 9, some loudspeakers of the plurality of loudspeakers 101 may define a corner of two rhombuses.

It will be appreciated that the audio device 100 as described in FIGS. 6 to 9 may comprise a plurality of first and second subsets, for example arranged in an alternative manner in the horizontal and vertical direction. For the sake of simplicity, such embodiments are not described in more detail herein.

Figure 10:
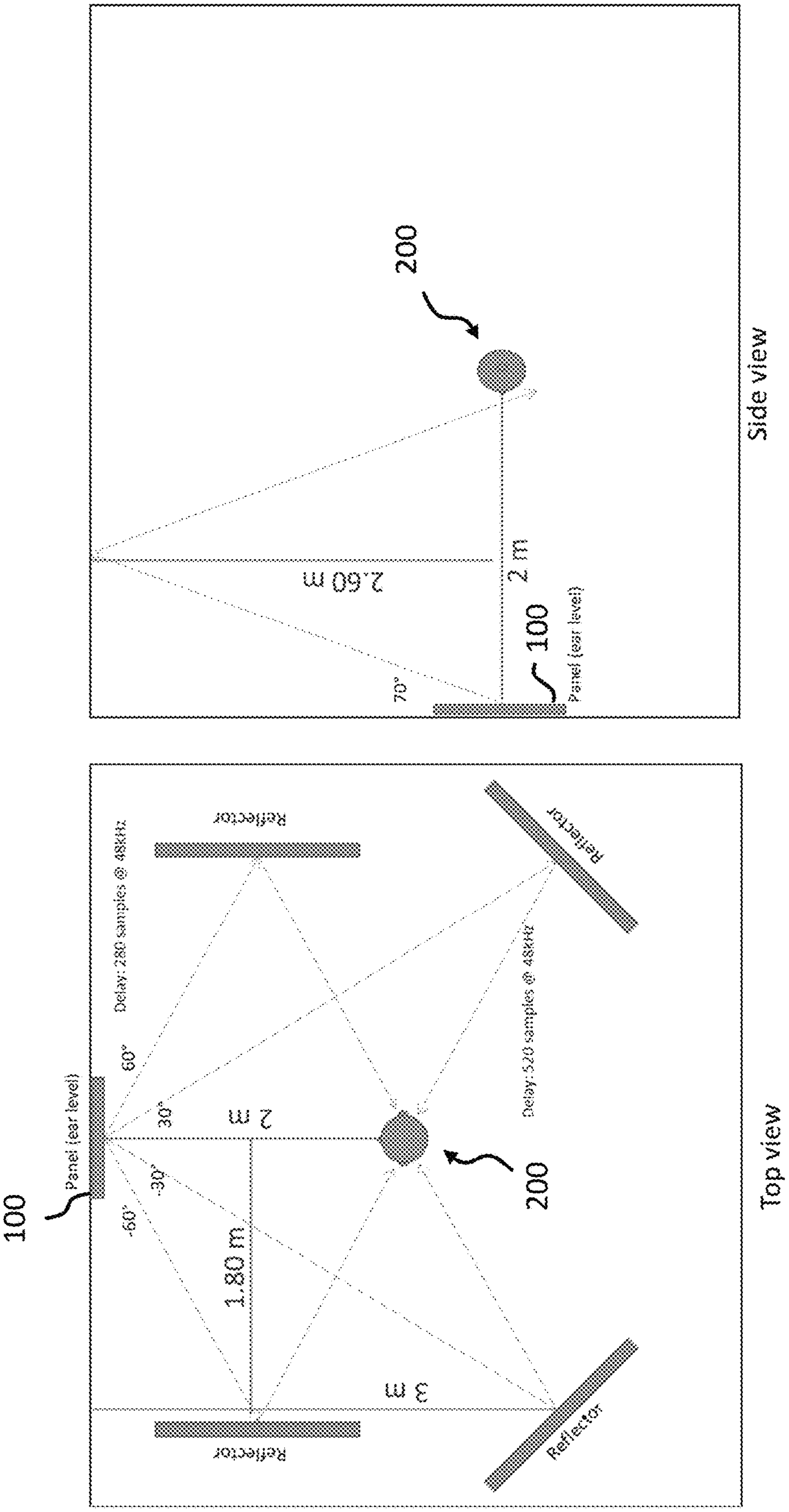
FIG. 10 shows a top view and a side view of a home-theater implementation of a device according to an embodiment.

FIG. 10 shows a top view and a side view of a home-theater implementation of the audio device 100 according to an embodiment. In the embodiment shown in FIG. 10 the audio device 100 is implemented as a sound panel 100 mounted at a similar height than the listener 200 with reflecting walls surrounding the listener 200.

Figure 11:
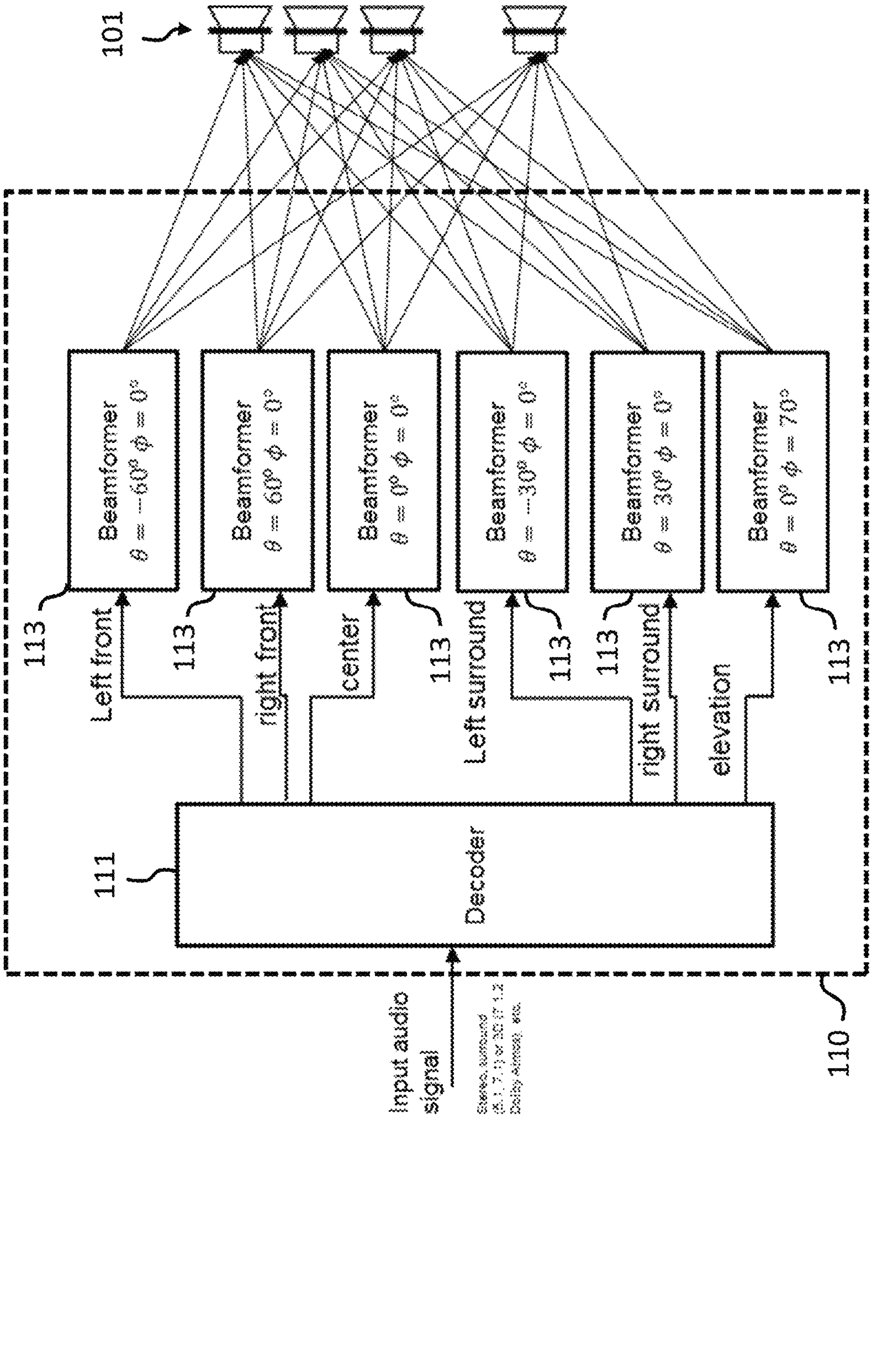
FIG. 11 is a schematic diagram illustrating the processing circuitry with a plurality of beamformers of a device according to an embodiment.
Figure 12:
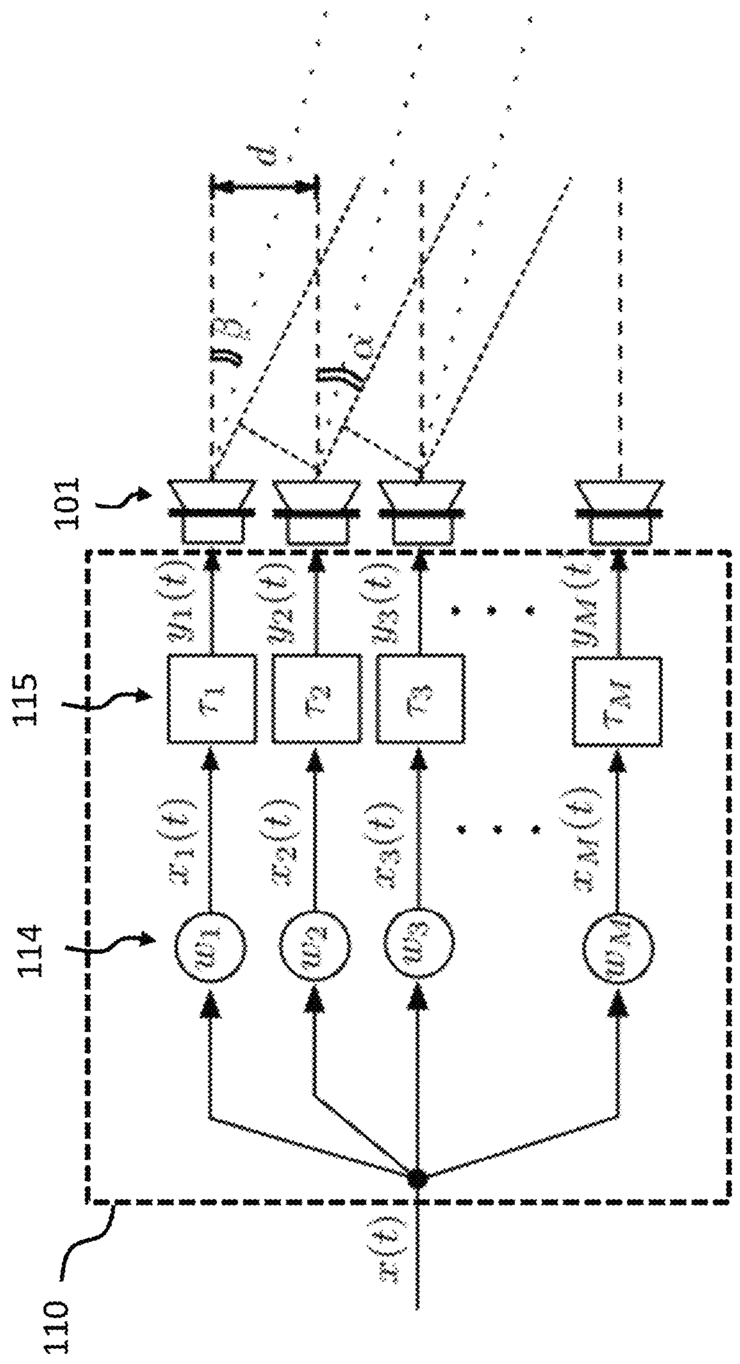
FIG. 12 is a schematic diagram illustrating in more detail aspects of the beamformers of the processing circuitry of FIG. 11.

FIGS. 11 and 12 show schematic diagrams illustrating the processing circuitry 110 of the audio device 100 according to an embodiment with a plurality of beamformers 113. In an embodiment, the processing circuitry 110 may implement a decoder 111 for decoding the input signal(s) and providing these to the plurality of beamformers 113. A respective beamformer 113 may be implemented as delay and add beam-former in a line array topology as shown in FIGS. 11 and 12. Given the signal x(t), the distance d between each of the M loudspeakers 101, and the emitting direction α, the goal is to emit the audio signal to direction α, while ignoring other directions.

A simple, but efficient way of achieving this is to delay (processing blocks 115 in FIG. 12) and possibly weight (processing blocks 114 in FIG. 12) the loudspeaker signals x1(*t*), x2(*t*), . . . , xM(t). The idea behind the delay and add beam-former 113 is that sound emitted in the desired direction is added in phase, while sound emitted in other directions is added not in phase resulting in more gain for sound in the desired direction. Thus, the delay and add beam-former 113 assumes that the loudspeakers 101 are point sources in the far field, e.g. far enough away that the sound arrives approximately as a plane wave front. At the listening point, the signal resulting from all loudspeaker contributions can then be derived as the sum of all loudspeaker signals weighted with w1=w2= . . . =wM=1/M, e.g.

$$y(t) = \frac{1}{M}\sum_{m=1}^{M} x_m(t - \tau_m) = \frac{1}{M}\sum_{m=1}^{M} y_m(t),$$

where y1(*t*), y2(*t*), . . . , yM(t) are the delayed loudspeaker signals. The delay is directly related to the distance d between each of the loudspeakers 101

$$\tau_m = \frac{(m-1)d\sin\alpha}{c}$$

wherein c denotes the velocity of sound in the air. The directional response of the beam-former 113 may be derived considering a delta Dirac pulse δ(t) emitted by the loudspeaker array and arriving at the listening point P as a plane wave front from the direction β. At the listening point, the signal resulting from all loudspeakers is in this case $$y(t) = \frac{1}{M}\sum_{m=1}^{M} \delta(t - (m-1)\Delta(\beta))$$

where the delay between two adjacent loudspeaker signals is $$\Delta(\beta) = \frac{d(\sin\beta - \sin\alpha)}{c}$$

The Fourier transform of the response to a delta Dirac signal yields the directional response as a function of frequency, e.g.:

$$D(\beta, f) = \frac{1}{M}\int_{-\infty}^{\infty}\sum_{m=1}^{M} \delta(t - (m-1)\Delta\beta))e^{-j2\pi ft}dt = \frac{1}{M}\sum_{m=0}^{M-1} e^{-j2\pi fm\Delta(\beta)}.$$

The limitation of the simple delay and add beam-former is that it can only be determined by defining the target direction α of the main radiation. For practical applications in consumer devices, however, it is important that the direct sound emitted to the listener is minimized at the same time. Thus, a second target angle with a minimal radiation is required.

Such advanced beam-former target functions may require more advanced modelling frameworks. To this end, the weights and delays may be optimized in different frequency bands (complex gains encoding gain and delay for each loudspeaker 101 and each frequency). A common approach is a least-squares optimization of a beam-former minimizing (in a least squares sense) the difference between a desired target radiation pattern and the beam-former radiation pattern. The resulting complex gains (delays and weights) are typically frequency dependent. One optimization factor is the maximum gain as this is dependent on the capabilities of the electro-acoustic system used.

For the embodiment of the audio device 100 comprising the stacked array of rhombic shaped loudspeaker sub-arrays (as illustrated in FIG. 9), each sub-array may be configured for processing different frequencies of the audio signal. As k=3 is optimal for the rhombus array, the crossover frequency $f_{co}$ between the two arrays for the example with 2 arrays with spacing d (first array) and 3d (second array) may be chosen at $$f_{co} = \frac{c}{3d/2}.$$

For a typical array with small spacing d in the range 2-4 cm and a large spacing of 3d in the range of 6-12 cm the crossover frequency can be in the range of ~2 kHz to 4 kHz. Obviously, small variations from this optimal frequency range are without large influence on the desired results and may be chosen equivalently in practice.

For each individual channel of the audio content to be reproduced by the audio device 100, two beamformers 113 may be provided by the processing circuitry 110 corresponding to the desired direction. The first beamformer is connected to the loudspeakers 101 of the first array (spacing d), while the second beamformer is connected to the loudspeakers 101 of the second array (spacing 3d). The parameters of the beamformers (such as delay and gains) may be obtained independently for the two beamformers. The separation of the audio signal into the two frequency bands can be obtained through a filterbank like a Linkwitz-Riley crossover or an alternative filter. The lower band signal is provided to the second beamformer, while the higher frequency band is provided to the first beamformer.

Figure 13:
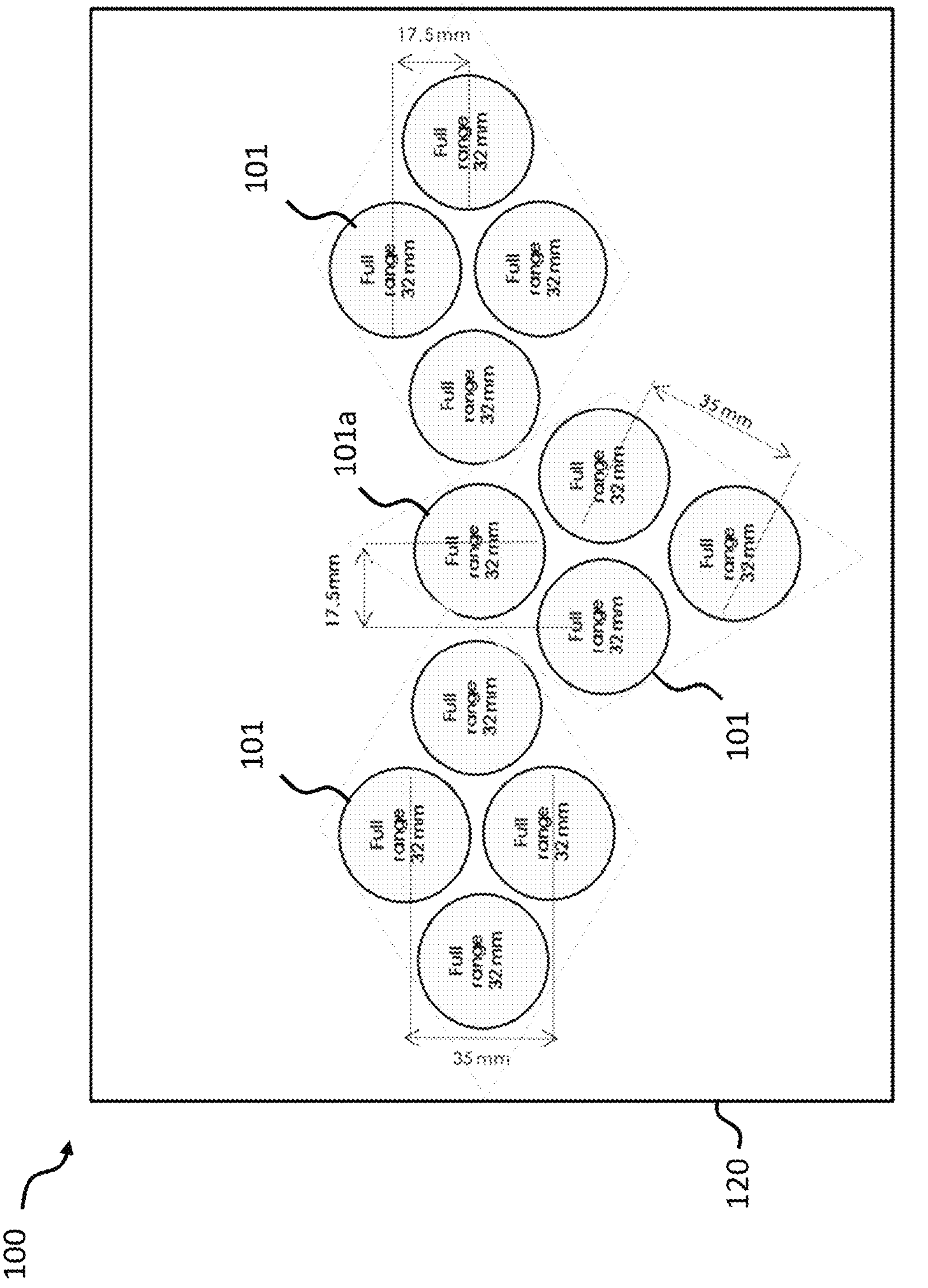
FIG. 13 shows a schematic diagram illustrating a device according to a further embodiment, including a plurality of loudspeakers arranged as a rhombus array.

FIG. 13 shows a further embodiment of the audio device 100 (similar to the embodiment shown in FIG. 7). The embodiment shown in FIG. 13 differs from the embodiment shown in FIG. 7 primarily in that in the embodiment shown in FIG. 13 three loudspeakers of the vertically orientated rhombus are located below the horizontal line defined by the two horizontally orientated rhombuses (in the embodiment of FIG. 7 three loudspeakers of the vertically orientated rhombus are located above the horizontal line defined by the two horizontally orientated rhombuses). Moreover, in the embodiment of FIG. 13 the central loudspeaker 101*a* is a component of all three sub-arrays, namely the two horizontally orientated rhombuses and the vertically orientated rhombus (allowing to minimize the number of loudspeakers 101, while still providing a rich sound experience). In the embodiment shown in FIG. 13, the twelve loudspeakers 101, which are mounted within the housing 120, may have a membrane diameter of 32 mm and a spacing d=35 mm.

Figure 14:
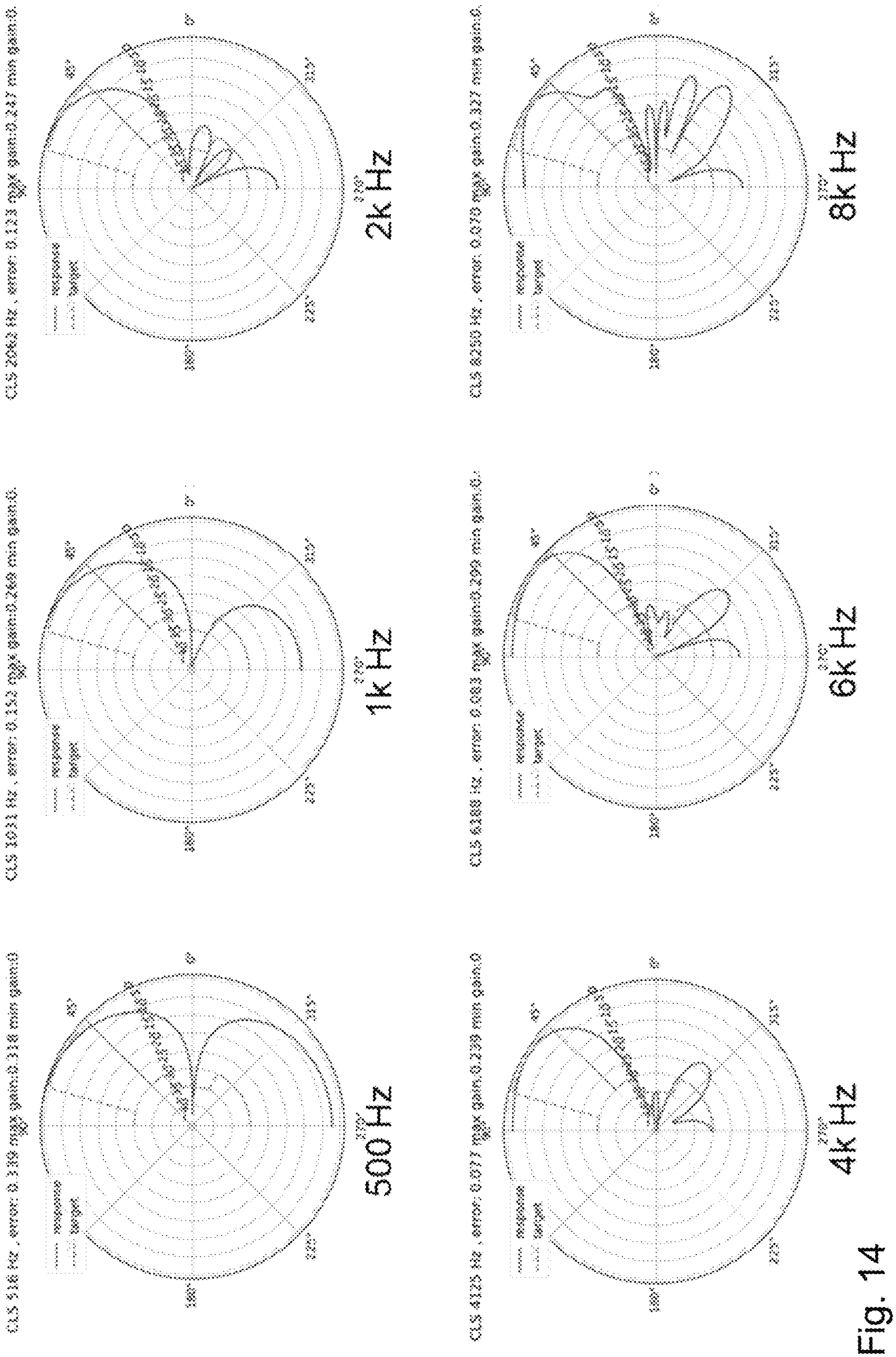
FIG. 14 shows directional beamformer responses for a 60 degree main radiation direction and a 0 degree zero radiation direction for a device according to an embodiment.

FIG. 14 shows directional beamformer responses for a 60 degree main radiation direction and a 0 degree zero radiation direction for the audio device 100 according to the embodiment shown in FIG. 13. The directional response could be used to create the impression of a sound source located at the right side of a listener located in the front of the audio device 100. The directional responses show that the sound level in the main radiation direction reaches a 20 dB higher level than the sound emitted directly towards the listener over a wide frequency range. Covering a frequency range between 500 Hz and 8 kHz is important for most applications. The reflected-to-direct-sound ratio is larger than 20 dB for this embodiment if suitable reflectors are present in the environment of the audio device.

Figure 15:
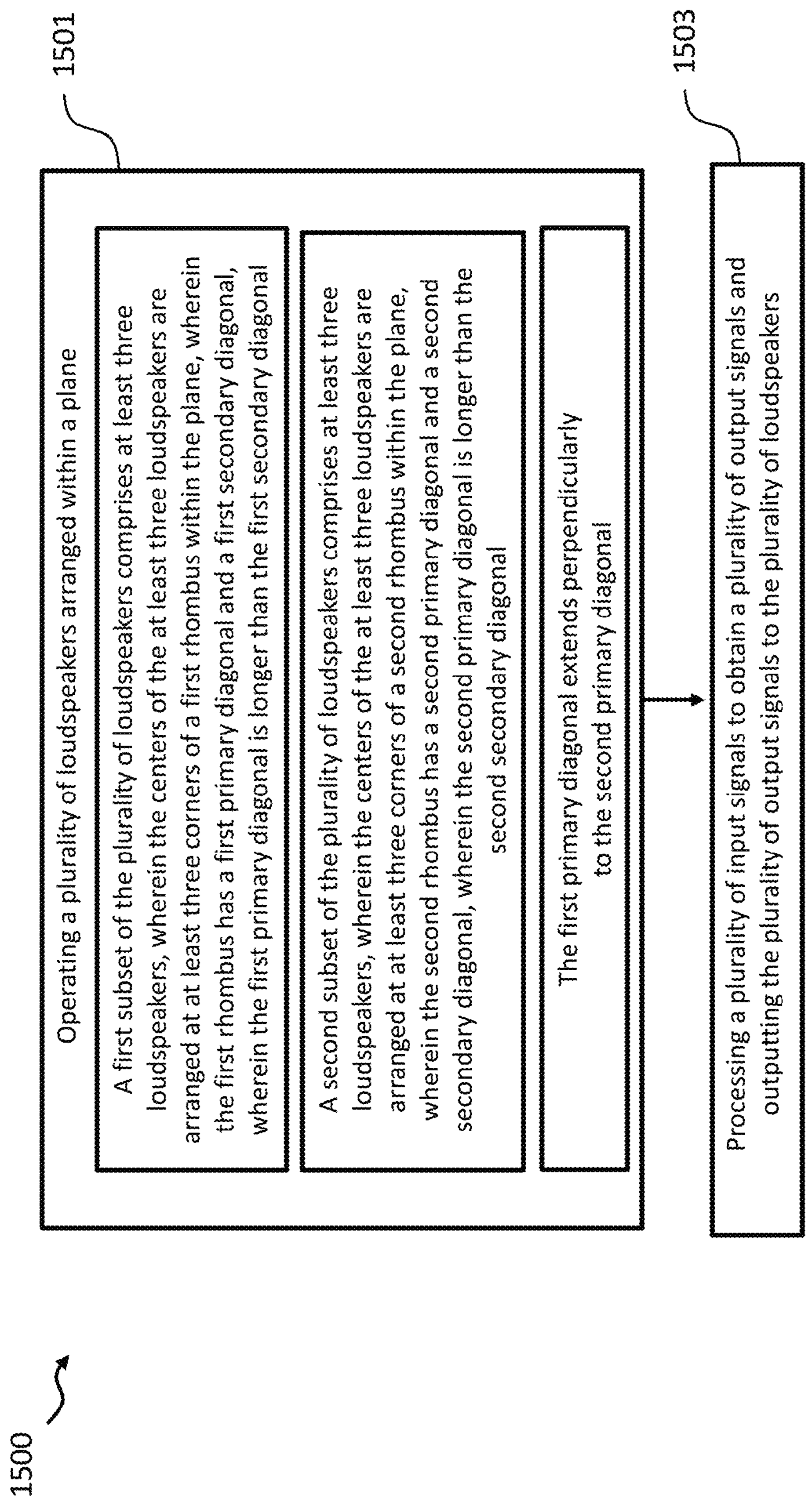
FIG. 15 is a flow diagram illustrating a method for generating a sound field according to an embodiment.

FIG. 15 is a flow diagram illustrating a method 1500 for generating a sound field according to an embodiment. The method comprises a first step 1501 of operating the plurality of loudspeakers 101 of the audio device 100 arranged at a plurality of locations within a plane. Moreover, the method 1500 comprises a step 1503 of processing a plurality of input signals to obtain a plurality of output signals and outputting the plurality of output signals to the plurality of loudspeakers 101. As already described above, a first subset of the plurality of loudspeakers 101 comprises at least three loudspeakers, wherein the centers of the at least three loudspeakers of the first subset are arranged at at least three corners of a first rhombus within the plane. The first rhombus has a first primary diagonal and a first secondary diagonal, wherein the first primary diagonal is longer than the first secondary diagonal. A second subset of the plurality of loudspeakers 101 comprises at least three loudspeakers, wherein the centers of the at least three loudspeakers of the second subset are arranged at at least three corners of a second rhombus within the plane. The second rhombus has a second primary diagonal and a second secondary diagonal, wherein the second primary diagonal is longer than the second secondary diagonal. The first primary diagonal extends perpendicularly to the second primary diagonal.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step).

For the several embodiments disclosed herein, it should be understood that the disclosed system, apparatus, and method may be implemented in other manners. For example, the described embodiment of an apparatus is merely exemplary. For example, the unit division is merely a logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units of the embodiments disclosed herein may be integrated into one processing unit, or each of the units may exist alone physically, or two or more units are integrated into one unit.

What is claimed is:

1. A device for producing a sound field, the device comprising:

a plurality of loudspeakers arranged at a plurality of locations within a plane; and a processing circuitry configured to process a plurality of input signals to obtain a plurality of output signals and output the plurality of output signals to the plurality of loudspeakers, wherein a first subset of the plurality of loudspeakers comprises at least three loudspeakers, wherein the centers of the at least three loudspeakers of the first subset are arranged as at least three corners of a first rhombus within the plane, wherein the first rhombus has a first primary diagonal and a first secondary diagonal, wherein the first primary diagonal is longer than the first secondary diagonal, wherein a second subset of the plurality of loudspeakers comprises at least three loudspeakers, wherein the centers of the at least three loudspeakers of the second subset are arranged as at least three corners of a second rhombus within the plane, wherein the second rhombus has a second primary diagonal and a second secondary diagonal, wherein the second primary diagonal is longer than the second secondary diagonal, wherein the first primary diagonal extends perpendicularly to the second primary diagonal, and wherein a length of the first secondary diagonal and/or second secondary diagonal is between d and 2d, wherein d is a minimum spacing of the loudspeakers and d is a natural number.

2. The device of claim 1, wherein the first primary diagonal has the same length as the second primary diagonal and/or wherein the first secondary diagonal has the same length as the second secondary diagonal.

3. The device of claim 1, wherein the first secondary diagonal has the same length as a side of the first rhombus and/or wherein the second secondary diagonal has the same length as a side of the second rhombus.

4. The device of claim 1, wherein a third subset of the plurality of loudspeakers comprises at least three loudspeakers, wherein the centers of the at least three loudspeakers of the third subset are arranged as at least three corners of a third rhombus within the plane, wherein the third rhombus has a third primary diagonal and a third secondary diagonal, wherein the third primary diagonal is longer than the third secondary diagonal, and wherein the third primary diagonal of the third rhombus extends parallel to the first primary diagonal of the first rhombus.

5. The device of claim 4, wherein the third primary diagonal of the third rhombus extends along the same notional line as the first primary diagonal of the first rhombus.

6. The device of claim 5, wherein at least one of the loudspeakers of the second subset is arranged above or below the notional line defined by the first primary diagonal of the first rhombus and the third primary diagonal of the third rhombus.

7. The device of claim 4, wherein the third primary diagonal has the same length as the first primary diagonal and/or wherein the third secondary diagonal has the same length as the first secondary diagonal.

8. The device of claim 4, wherein the third secondary diagonal has the same length as a side of the third rhombus.

9. The device of claim 4, wherein one of the plurality of loudspeakers is part of the second subset and the first subset or the third subset.

10. The device of claim 1, wherein one of the plurality of loudspeakers is part of the second subset and the first subset or the third subset.

11. The device of claim 1, wherein a fourth subset of the plurality of loudspeakers comprises at least three loudspeakers, wherein the centers of the at least three loudspeakers are arranged as at least three corners of a fourth rhombus within the plane, wherein a side of the fourth rhombus is between 2 and 4 times longer than a side of the first rhombus, wherein the fourth rhombus has a fourth primary diagonal and a fourth secondary diagonal, and wherein the fourth primary diagonal is longer than the fourth secondary diagonal.

12. The device of claim 11, wherein the fourth primary diagonal extends perpendicularly to the first primary diagonal of the first rhombus or perpendicularly to the second primary diagonal of the second rhombus.

13. The device of claim 1, wherein the processing circuitry is further configured to implement one or more beamformers for processing, based on a desired main radiation direction, the plurality of input signals to obtain the plurality of output signals.

14. The device of claim 11, wherein the processing circuitry is further configured to implement one or more first beamformers for processing, based on a first desired main radiation direction, the plurality of input signals in a first frequency range to obtain the plurality of output signals for the fourth subset of the plurality of loudspeakers and to implement one or more second beamformers for processing, based on a second desired main radiation direction, the plurality of input signals in a second frequency range to obtain the plurality of output signals for the first and/or second subset of the plurality of loudspeakers.

15. The device of claim 14, wherein a crossover frequency between the first frequency range and the second frequency range is between 2 and 4 kHz.

16. The device of claim 1, wherein the loudspeakers within the subset are adjacent loudspeakers.

17. A method for producing a sound field, the method comprising:

operating a plurality of loudspeakers arranged at a plurality of locations within a plane; and processing a plurality of input signals to obtain a plurality of output signals and outputting the plurality of output signals to the plurality of loudspeakers, wherein a first subset of the plurality of loudspeakers comprises at least three loudspeakers, wherein the centers of the at least three loudspeakers of the first subset are arranged as at least three corners of a first rhombus within the plane, wherein the first rhombus has a first primary diagonal and a first secondary diagonal, wherein the first primary diagonal is longer than the first secondary diagonal, wherein a second subset of the plurality of loudspeakers comprises at least three loudspeakers, wherein the centers of the at least three loudspeakers of the second subset are arranged as at least three corners of a second rhombus within the plane, wherein the second rhombus has a second primary diagonal and a second secondary diagonal, wherein the second primary diagonal is longer than the second secondary diagonal, wherein the first primary diagonal extends perpendicularly to the second primary diagonal, and wherein a length of the first secondary diagonal and/or second secondary diagonal is between d and 2d, wherein d is a minimum spacing of the loudspeakers and d is a natural number.

18. The method according to claim 17, wherein a desired main radiation direction is obtained based on the plurality of output signals of the first and second subset of loudspeakers.

19. The method according to claim 18, wherein a desired main radiation direction comprises a horizontal main radiation direction and/or a vertical main radiation direction.

20. The method according to claim 18, wherein the desired main radiation direction is obtained by providing one or more beamforming filters determined according to the first and second subset of loudspeakers.

21. The method according to claim 17, wherein the loudspeakers within the subset are adjacent loudspeakers.

22. A non-transitory computer-readable storage medium storing program code that, upon execution by a computer or a processor, causes the computer or the processor to perform a method for producing a sound field, the method comprising:

operating a plurality of loudspeakers arranged at a plurality of locations within a plane; and processing a plurality of input signals to obtain a plurality of output signals and outputting the plurality of output signals to the plurality of loudspeakers, wherein a first subset of the plurality of loudspeakers comprises at least three loudspeakers, wherein the centers of the at least three loudspeakers of the first subset are arranged as at least three corners of a first rhombus within the plane, wherein the first rhombus has a first primary diagonal and a first secondary diagonal, wherein the first primary diagonal is longer than the first secondary diagonal, wherein a second subset of the plurality of loudspeakers comprises at least three loudspeakers, wherein the centers of the at least three loudspeakers of the second subset are arranged as at least three corners of a second rhombus within the plane, wherein the second rhombus has a second primary diagonal and a second secondary diagonal, wherein the second primary diagonal is longer than the second secondary diagonal, wherein the first primary diagonal extends perpendicularly to the second primary diagonal, and wherein a length of the first secondary diagonal and/or second secondary diagonal is between d and 2d, wherein d is a minimum spacing of the loudspeakers and d is a natural number.

* * * * *